A. F. HAWKSLEY.
RESILIENT WHEEL.
APPLICATION FILED OCT. 20, 1913.

1,159,218.

Patented Nov. 2, 1915.
3 SHEETS—SHEET 1.

WITNESSES.

INVENTOR
Arthur F. Hawksley

Attorney

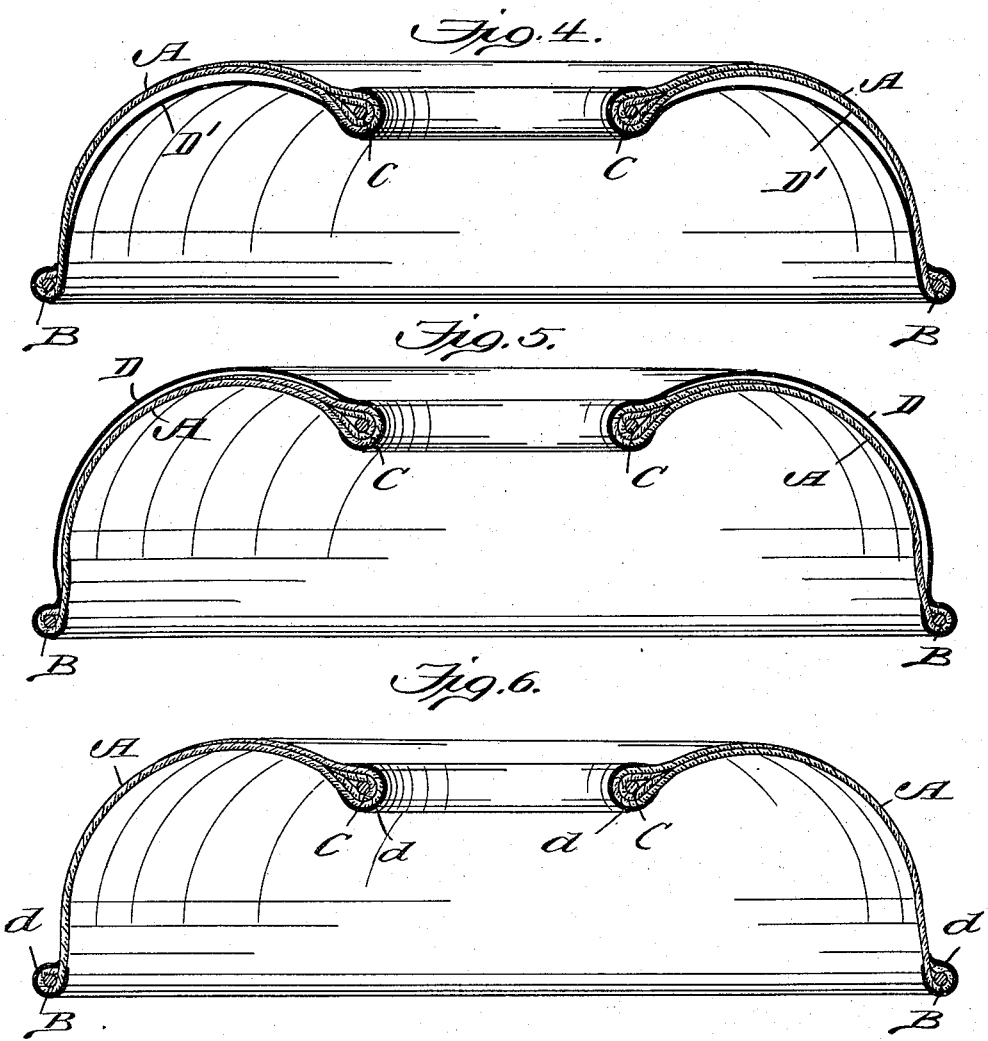

UNITED STATES PATENT OFFICE.

ARTHUR FREDK. HAWKSLEY, OF FAIRHAVEN, ENGLAND.

RESILIENT WHEEL.

1,159,218.  Specification of Letters Patent.  Patented Nov. 2, 1915.

Application filed October 20, 1913. Serial No. 796,331.

*To all whom it may concern:*

Be it known that I, ARTHUR FREDERICK HAWKSLEY, a British subject, residing at Fairhaven, county of Lancaster, England, have invented certain new and useful Improvements in Resilient Wheels, of which the following is a specification.

This invention relates to pneumatic or resilient wheels in which a number of pneumatic cushions are inserted in or applied to the wheels as described in the specification of my former United States Patent 1044522. The covers for these pneumatic cushions are constructed in an annular form of curved or semi-circular contour in cross section with a fixing or retaining ring around the periphery and another in the center. These covers have been constructed of cords or fabric wound around the two rings and molded with rubber into a curved or semi-circular form between the rings; the fabric or cords being embedded in layers of rubber applied both to the outside and inside of the cushion. Where cords are used embedded in thick layers of rubber I find that the rubber is liable to split between the cords and form gaps or spaces into which portions of the air tube—placed between the covers—may be forced causing the tube to burst.

The invention consists essentially in constructing such covers for pneumatic wheel cushions with rubber impregnated cords which are but slightly attached, unattached or relatively loose to one another, without embedding the cords in layers of rubber and in applying to either the inner or concave side of the cords or to the outer or convex side of the cords or to both an unattached or loose covering of rubber or other material.

The invention will be fully described with reference to the accompanying drawings.

Figure 1:
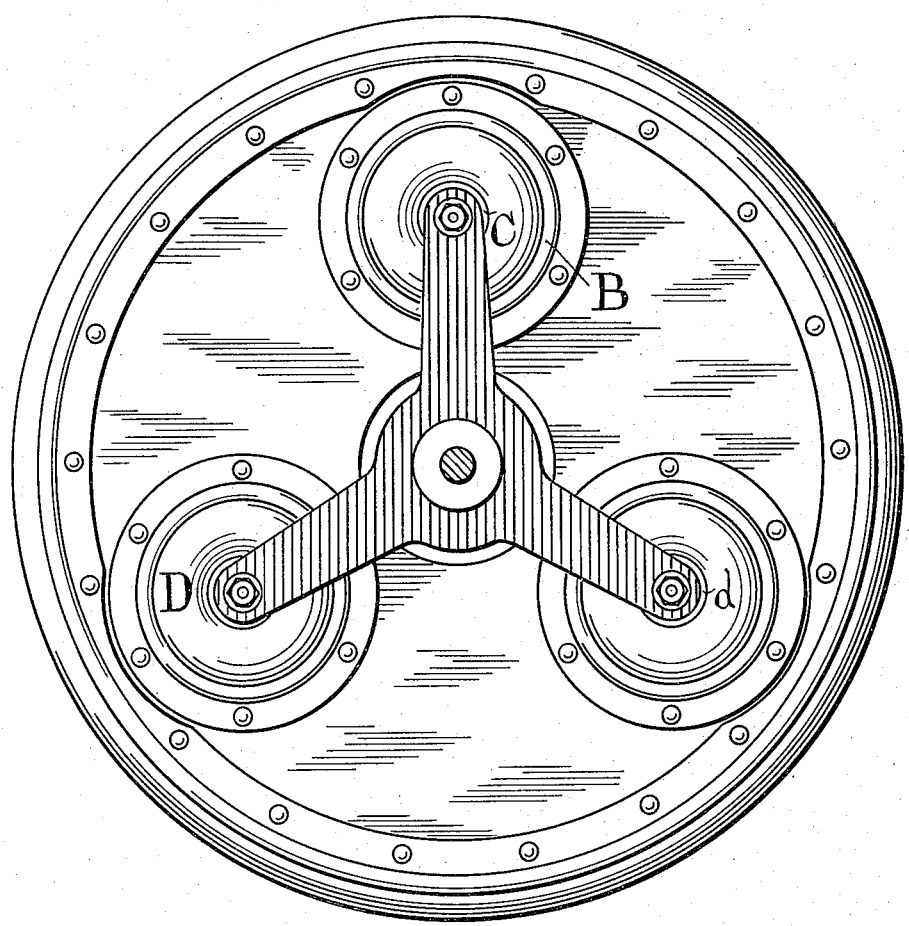
Figure 3:
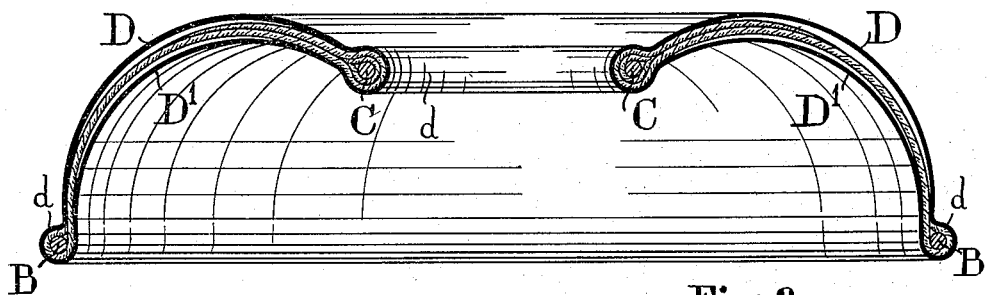
Figure 2:
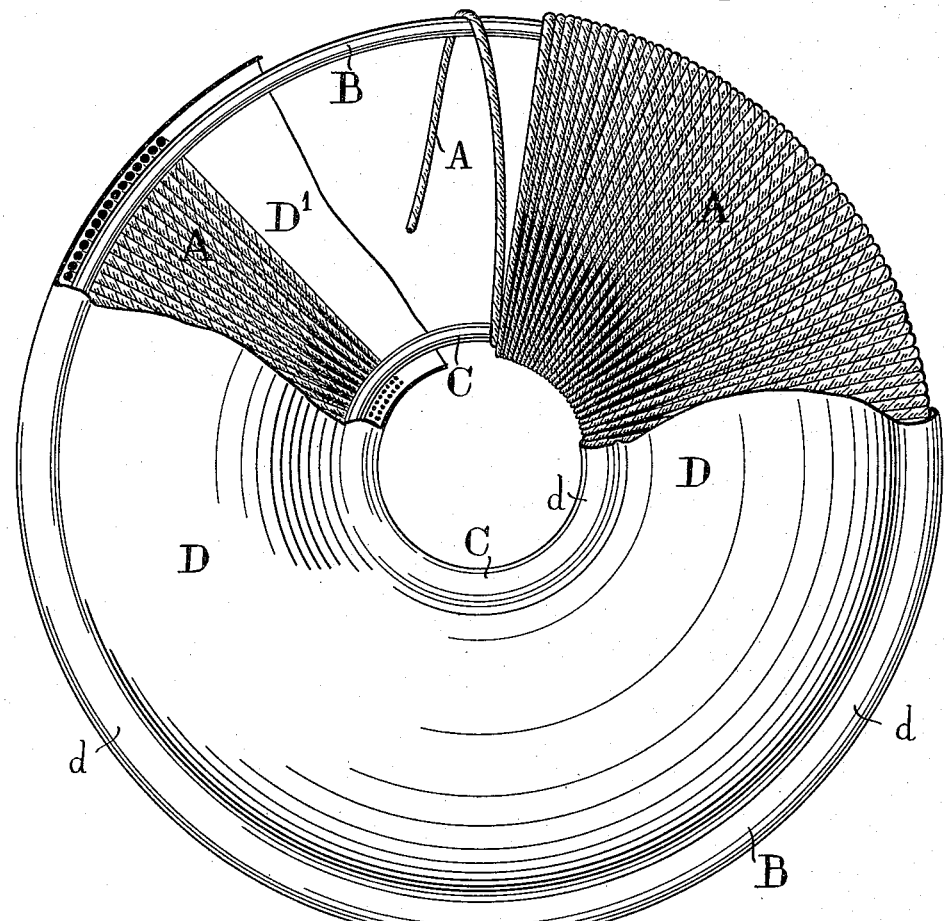

Figure 1. is a front elevation of wheel. Fig. 2. is a front elevation of a cover partly in section. Fig. 3. is a sectional elevation of a cover with the cords partly removed. Fig. 4 is a sectional elevation of a modification showing the layer of rubber applied to the concave side of the cords. Fig. 5 is a sectional elevation of a modification showing the layer of rubber applied to the convex side of the cords, and Fig. 6 is a sectional elevation of a modification showing the layers or liners omitted and a covering of rubber applied to the cords over and around the concentric axially spaced rings.

I construct the cushion cover of cords A wound upon the rings B and C as hitherto. The cords A are saturated or prepared with rubber sufficient when molded and vulcanized to cause them to maintain the shape imparted to them but are not embedded in layers of rubber on both sides as has hitherto been the case. The covers are preferably molded to the shape shown in U. S. Patent 1044522. I apply a cover or lining D' of sheet rubber or rubber coated or other fabric to the inner or concave side of the cover which is secured to at or near the rings or edges B and C but otherwise loose or unattached to the cords, or it may be entirely unattached and if made of rubber is of sufficient thickness not to be forced between the cords. Over the outer or convex side of the cover I also apply a protective covering D of a loose sheet of rubber or rubber coated, or other fabric which is attached to at or near the rings or edges B and C but is otherwise loose or unattached to the cords A. A covering $d$ of rubber is applied to the cords over or around the rings B and C to form beads by which the cushions are clamped in position; this may if desired form part of the loose or unattached covers D and D'.

The inside cover or lining D' may be dispensed with, as shown in Fig. 4, and the inner tube made sufficiently thick to prevent its being forced through interstices between the cords A, and the protective cover D may also be dispensed with, as shown in Fig. 5.

In constructing a cover the cords A which are rubber coated or saturated are wound over the rings B and C in the usual way a rubber covering $d$ being applied over the rings and a loose sheet of rubber D' is applied over the inner side and preferably also over the outer side of the cords and may be secured in position at or near the edges.

What I claim as my invention and desire to protect by Letters Patent is:—

1. In a cover for the cushions of resilient wheels constructed of rubber-impregnated cords wound upon two co-axial rings and but slightly attached to one another without being embedded in rubber, a covering applied over one side of the cords, which covering is loose and unattached relatively to said cords and permits independent movement of the cords relatively to the covering.

2. In a cover for the cushions of resilient wheels constructed of rubber-impregnated cords wound upon two co-axial rings without being embedded in rubber, a covering applied over the concave inner side of the cords to prevent an inflated tube extruding between the cords, and a similar covering applied over the outer convex side of the cords, said coverings being loose and unattached relatively to said cords and permitting independent movement of the cords relatively to the coverings.

3. In a cover for the cushions of resilient wheels constructed of rubber-impregnated cords wound upon two co-axial rings without being embedded in rubber, a covering applied over the convex outer side of the cords, said covering being loose and unattached relatively to the cords and permitting independent movement of the cords relatively to the covering.

4. In a cover for the cushions of resilient wheels having two co-axial rings and rubber-impregnated cords wound upon them, a covering of flexible material applied over the concave inner side of the cords, said covering being attached only to the external and internal peripheral edges of the cords and loose and unattached relatively to the intermediate portions of the cords, permitting independent movement of the cords relatively to the covering.

5. In a cover for the cushions of resilient wheels embodying two co-axial rings and rubber-impregnated cords wound upon them, a covering of flexible material applied over the convex outer side of the cords and attached only to the external and internal periphery edges of the cords, the covering being loose and unattached relatively to the intermediate portions of the cords and permitting independent movement of such portions of the cords relatively to the covering.

6. In a cover for the cushions of resilient wheels embodying two co-axial rings and rubber-impregnated cords wound upon them, a covering of flexible material applied over the concave inner side of the cords, and an additional covering of flexible material applied over the convex outer side of the cords, such coverings adhering only to the external and internal peripheral edges of the cords and permitting independent movement of the intermediate portions of the cords relatively to the coverings.

In testimony whereof I have hereunto set my hand in presence of two subscribing witnesses.

A. FREDK. HAWKSLEY.

Witnesses:
J. OWDEN O'BRIEN,
GEO. H. O'BRIEN.

Copies of this patent may be obtained for five cents each, by addressing the "Commissioner of Patents, Washington, D. C."